United States Patent [19]
Oseto

[11] Patent Number: 6,097,797
[45] Date of Patent: Aug. 1, 2000

[54] NETWORK FACSIMILE APPARATUS CAPABLE OF E-MAIL COMMUNICATIONS

[75] Inventor: Futoshi Oseto, Yokohama, Japan

[73] Assignee: Ricoh Company, Ltd., Tokyo, Japan

[21] Appl. No.: 09/080,734

[22] Filed: May 18, 1998

[30]   Foreign Application Priority Data

May 19, 1997   [JP]   Japan .................................. 9-142912

[51] Int. Cl.[7] .............................................. H04M 11/00
[52] U.S. Cl. ............................... 379/100.08; 379/100.09; 358/402
[58] Field of Search ........................ 379/100.08, 100.13, 379/100.14, 100.01, 93.24, 88.13, 88.14, 100.09; 358/402

[56]                References Cited

U.S. PATENT DOCUMENTS

| 5,438,433 | 8/1995 | Reifman et al. ...................... 358/468 |
| 5,761,415 | 6/1998 | Joseph et al. ....................... 379/93.24 |
| 5,812,278 | 9/1998 | Toyoda et al. ....................... 379/93.03 |
| 5,862,202 | 1/1999 | Bashoura et al. .................. 379/100.14 |

*Primary Examiner*—Stella Woo
*Attorney, Agent, or Firm*—Cooper & Dunham LLP

[57]                 ABSTRACT

A data terminal which is coupled to an local area network and a public switched telephone network includes a sub-address generator that generates a sub-address based on an electronic mail address and a predetermined functional operation method. A data table generator generates an address conversion table correlating a plurality of sub-addresses to corresponding input electronic mail addresses. Each of the plurality of sub-addresses being uniquely coupled with a corresponding electronic mail address that is uniquely assigned to a single client terminal. The data terminal also includes memory to store the address conversion table and a terminal controller. The terminal controller checks an incoming call from a facsimile machine containing facsimile image information and a sub-address representing a destination client terminal, and upon receiving such incoming facsimile image information and sub-address, the controller determines an electronic mail address corresponding to the sub-address using the address conversion table. The controller then relays the facsimile image information to the destination client terminal at the determined appropriate electronic mail address.

31 Claims, 12 Drawing Sheets

| ID (20) | SUB-ADDRESS (21) | E-MAIL ADDRESS (22) |
|---|---|---|
| 1 | 18446744073708000000 | USER1@***.CO.JP |
| 2 | 12453574345411564546 | USER2@***.CO.JP |
| 3 | 10124023465484867521 | USER3@***.CO.JP |
| 4 | 5465481257961765 | group1@***.CO.JP |
| 5 | 648565468871 | user4@***.CO.JP |
| ... | ... | ... |

| I D | SUB-ADDRESS | E-MAIL ADDRESS |
|---|---|---|
| 1 | 18446744073708000000 | USER1@***.CO.JP |
| 2 | 12453574345411564546 | USER2@***.CO.JP |
| 3 | 10124023465484867521 | USER3@***.CO.JP |
| 4 | 5465481257961765 | group1@***.CO.JP |
| 5 | 648565468871 | user4@***.CO.JP |
| ... | ... | ... |

20 21 22

2a

| ID | SUB-ADDRESS | E-MAIL ADDRESS |
|---|---|---|
| 1 | 198293849022 | john@DMc.JP |
| 2 | 93939789432 | mike@***.uk |
| 3 | 865682446556 | hanaka@DMb.CO.JP |
| 4 | 5465481257961765 | group1@***.CO.JP |
| 5 | 648565468871 | user4@***.CO.JP |
| ... | ... | ... |

NETWORK FACSIMILE APPARATUS CAPABLE OF E-MAIL COMMUNICATIONS

BACKGROUND

1. Field

The disclosed system and method relates to a network facsimile apparatus, and more particularly to a network facsimile apparatus which is capable of functionally generating a sub-address that is uniquely related to an electronic mail address of a client terminal.

2. Description of the Related Art

There has been developed a so-called network facsimile machine that is capable of exchanging E-mail (electronic mail) with other data terminals via a local area network and the Internet, as well as exchanging facsimile data with other facsimile machines via a public switched telephone network (PSTN). Such a network facsimile machine has been provided with an address conversion table that includes a plurality of sub-addresses and of corresponding network addresses such as electronic mail addresses. When the network facsimile machine receives a sub-address from a sending facsimile machine during a communications session via the public switched telephone network (PSTN), it examines the address conversion table with the received sub-address so as to obtain an appropriate electronic mail address of a destination data terminal. The network facsimile machine then transmits the received facsimile image information to the thus-specified destination data terminal via a local area network (LAN). By using the network facsimile machine, it becomes possible for users to easily transmit facsimile image information to a data terminal connected to a local area network from a facsimile machine connected to the PSTN. Accordingly, users can benefit from such convenient connections between networks of the facsimile machines and data terminals.

However, the above-mentioned network facsimile machines have a drawback. If a single data terminal has a plurality of sub-address, sending facsimile machines may have problems communicating with the single data terminal. A plurality of different sub-addresses may be given to a single data terminal when a user owes an account for his single data terminal at a plurality of the network facsimile machines, each one of which belongs to a different domain. In this case, Group 3 facsimile machines are generally required to specify a destination data terminal with a sub-address during a time of exchanging protocols, so that a user needs to maintain a cross reference of the sub-addresses and the telephone numbers of the network facsimile machines.

It is believed that there is no system available that allows users to use E-mail addresses instead of sub-addresses to transmit image information from a facsimile apparatus to a LAN-connected (local area network connected) destination data terminal via a network facsimile apparatus connected to the same LAN (local area network).

SUMMARY

The present application provides a data terminal that can be coupled to an local area network and a public switched telephone network. In one embodiment, the data terminal includes a sub-address generator, a data table generator, memory and a terminal controller.

The sub-address generator generates sub-address based on an electronic mail address that is typically entered by an operator of the terminal. The data table generator generate an address conversion table that correlates a plurality of sub-addresses generated by said sub-address generator to corresponding electronic mail addresses. Preferably, each of the plurality of sub-addresses is uniquely coupled with a corresponding electronic mail address that is uniquely assigned to a single client terminal. The memory stores the address conversion table.

The terminal controller is used to check an incoming calls from a sending facsimile machines containing facsimile image information and a sub-address representing a destination client terminal. When the controller receives such incoming facsimile image information and sub-address, it determines an electronic mail address the corresponds to the received sub-address using said address conversion table. After the electronic mail address is determined the controller relays said facsimile image information to the destination client terminal at the determined electronic mail address.

The sub-address generator can use a Hash functional operation or data encryption standards to generate the sub-addresses. If the Hash functional operation is used the sub-address generated is in decimal representation having a number of digits determined by a number of characters contained in the electronic mail address.

The present application also provides an electronic communications system that is capable of routing incoming facsimile information to destination client terminals using E-mail. In one embodiment, the system includes a sending facsimile terminal connected to a public switched telephone network and a plurality of domains.

Each domain preferably includes at least a destination client terminal connected to a local area network and at least a relaying data terminal connected to the destination client terminal via the local area network. The relaying data terminal is also connected to the sending facsimile terminal via the public switched telephone network.

In one embodiment, the relaying data terminal includes a first sub-address generator, a data table generator, memory and a terminal controller. The first sub-address generator generates sub-address based on an electronic mail address that is typically entered by an operator of the terminal. The data table generator generate an address conversion table that correlates a plurality of sub-addresses generated by said sub-address generator to corresponding electronic mail addresses. Preferably, each of the plurality of sub-addresses is uniquely coupled with a corresponding electronic mail address that is uniquely assigned to a single client terminal. The memory stores the address conversion table.

The terminal controller is used to check an incoming calls from a sending facsimile machines containing facsimile image information and a sub-address representing a destination client terminal. When the controller receives such incoming facsimile image information and sub-address, it determines an electronic mail address the corresponds to the received sub-address using said address conversion table. After the electronic mail address is determined the controller relays said facsimile image information to the destination client terminal at the determined electronic mail address.

The first sub-address generator can use a Hash functional operation or data encryption standards to generate the sub-addresses. If the Hash functional operation is used the first sub-address generated is in decimal representation having a number of digits determined by a number of characters contained in the electronic mail address.

In addition, the sending facsimile terminal preferably includes a second sub-address generator and a facsimile controller. The second sub-address generator generates a sub-address based on an electronic mail address for a destination client terminal. The facsimile controller controls the transmission of facsimile image information and the sub-address generated by the second sub-address generator to the relaying data terminal.

The second sub-address generator can also use a Hash functional operation or data encryption standards to generate the second sub-addresses. If the Hash functional operation is used the second sub-address generated is in decimal representation having a number of digits determined by a number of characters contained in the electronic mail address.

The system according to the present application the sending facsimile terminal may also include an electronic mail address form checker. The form checker is used to avoid unnecessary operation of the sub-address generating process. To achieve this, the form checker checks the entered electronic mail address for a destination client terminal to determine if the address is in the proper format. If the format is not in the proper format the form checker provides an indication to, for example an operator of the sending facsimile terminal, that the intended facsimile transmission includes an improper electronic mail address and stops further operations so that the operator can re-enter the electronic mail address.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3 is a table representing a relationship between a serial number, a sub-address, and a corresponding electronic mail address;

DETAILED DESCRIPTION

Figure 1:
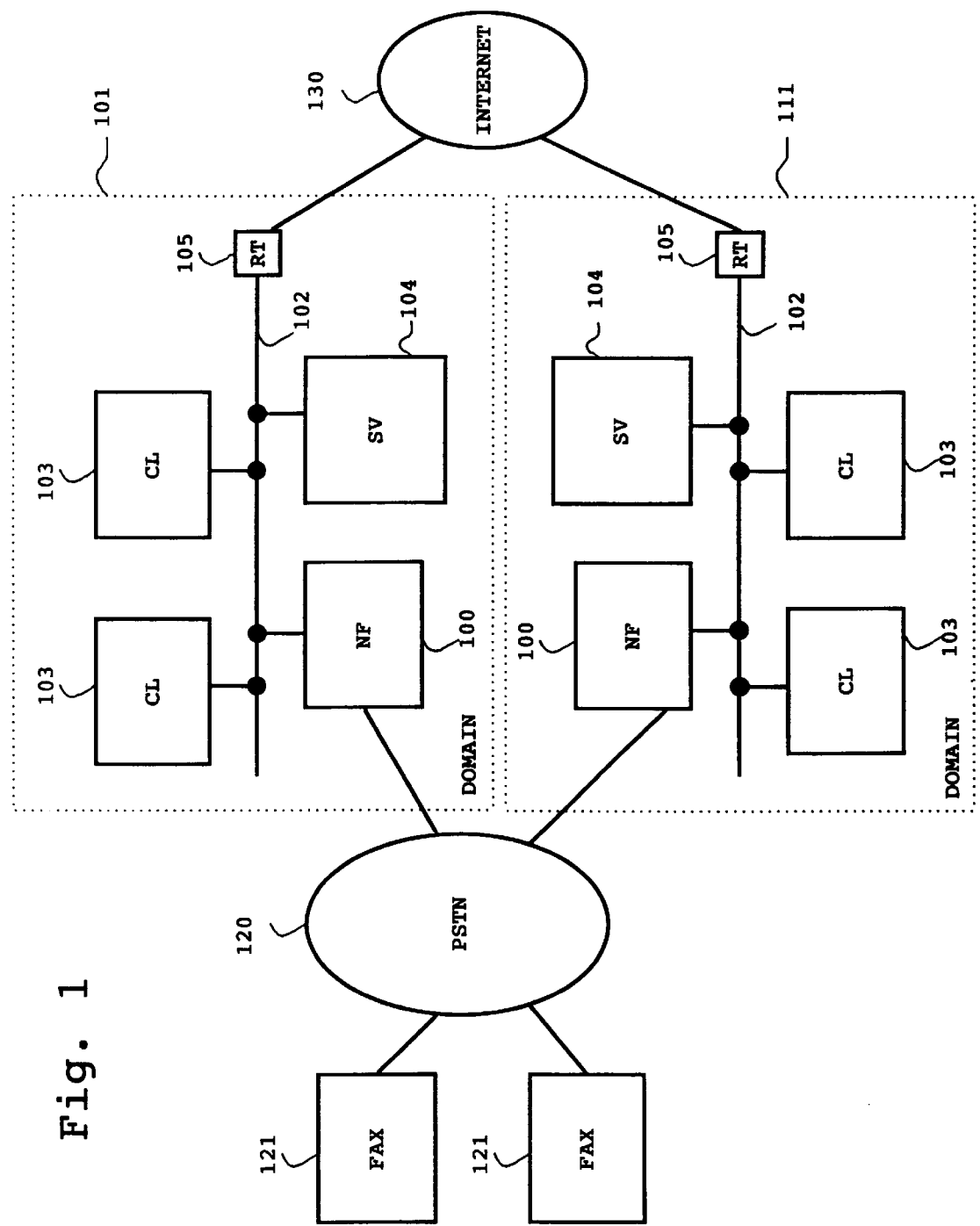
FIG. 1 is a block diagram of an electronic communications system including a network facsimile apparatus according to the present application.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a network facsimile apparatus (NF) 100. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated.

The DM 101 includes a local area network (LAN) 102 that connects various devices, including the above-mentioned network facsimile apparatus 100, a plurality of client terminals (CL) 103, a mail server (SV) 104, and a router (RT) 105 and that allows communications between the various devices. The DM 111 has a similar configuration to that of the DM 101 for the sake of simplicity. The PSTN 120 connects a plurality of communications terminals including Group 3 facsimile machines (FAX) 121 and 122 to allow communications among these terminals. The Internet 130 connects a plurality of domains (DMs), including the DMs 101 and 111, and allows communications between the domains.

In each of the DMs 101 and 111, the network facsimile apparatus 100 is connected to the LAN 102. The PSTN 120 is connected to each network facsimile machine and functions as a gateway to both networks. The RT 105 is connected to the LAN 102 and the Internet 130 to function as another gateway to these networks. Through these connections, each of the LANs 102 has a connection to the plurality of communications terminals including the FAXs 121 and 122 through the PSTN 120 and to the plurality of domains through the Internet 130.

Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 100, each of the CLs 103, and the SV 104 is given an individual network address, usually based on its individual address information coupled with the corresponding domain identification. A user who uses a client terminal in the DM 101 is provided with an individual user address which is usually based on the user's individual name coupled with the above-mentioned individual network address of the client terminal. Such an individual user address that is generally made of alphanumeric symbols including alphabetical characters is referred to as an electronic mail (E-mail) address. Using these network addresses and E-mail addresses, communications are carried out between terminals including the CLs 103 and the network facsimile apparatus 100 within a domain and between domains through the Internet 130.

The network facsimile apparatus 100 sends and receives electronic mail (E-mail) to and from other terminal machines through the LAN 102. The network facsimile apparatus 100 further has general facsimile functions including a Group 3 facsimile communications capability for transmitting and receiving facsimile image information to and from destination facsimile machines through the PSTN 120.

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In addition to the E-mail address, each of the CLs 103 is given an individual number for identifying itself when performing communications with one of the Group 3 communications terminals including the FAXs 121 and 122 over the PSTN 120, for example. The reason for this is that when these Group 3 communications terminals call to the CLs 103 they typically designate the destination CLs 103 by numeric information. Such an individual number given to each of the CLs 103 is referred to as a sub-address. In this connection, when one of the communications terminals including the FAXs 121 and 122 sends facsimile image information via the PSTN 120 to one of the CLs 103 of DM 101, for example, the sending facsimile machine needs to call the network facsimile apparatus 100 using its telephone number and, during the time of exchanging communication protocols, sends to the network facsimile apparatus 100 the sub-address of the destination CL 103 of the DM 101. After receiving the sub-address of the destination CL 103 and the facsimile image information from the sending facsimile machine, the network facsimile apparatus 100 converts the sub-address into an E-mail address corresponding to the destination client terminal 103 and sends the facsimile information to the mail server 104 for distribution to that destination CL 103.

As described above, in the example of the electronic communications system being described, the network facsimile apparatus 100 uses the E-mail addresses to relay the facsimile image information sent from the Group 3 communications terminals over the PSTN 120 to the CLs 103. In this case, if the sending facsimile machine designates a plurality of destination client terminals, the network facsimile apparatus 100 relays the facsimile image information to these destination client terminals, accordingly.

It may also be possible for the network facsimile apparatus 100 to relay the facsimile image information sent from the Group 3 communications terminals over the PSTN 120 to one or more of the CLs 103 that belong to other domains by using, for example, an E-mail distribution function of the Internet 130.

In each of the DMs 101 and 111, the LAN 102 employs a mail server system in which incoming E-mail is first stored in the SV 104 and then sent to a destination client terminal. More specifically, when E-mail information reaches a domain, the domain, for example DM 101, checks a destination mail address attached to the E-mail and if the destination mail address is for a client terminal of that domain the mail server system of the domain stores the E-mail into the SV 104. When the E-mail has a destination mail address other than one controlled by the domain, the mail server system of the domain transmits the E-mail to the Internet 130 via the RT 105, and the E-mail is sent to another domain, e.g. the DM 111, to seek the destination terminal machine, or to a host machine that has an address corresponding to the destination mail address attached to the E-mail, through a data transmission function of the Internet 130.

At a certain interval, the network facsimile apparatus 100 and the CLs 103 in each domain, e.g., DM 101 and 111, request the SV 104 to check if an incoming E-mail addressed for a user of the requesting machine is stored therein. If an E-mail addressed to the user of the requesting machine is stored in the SV 104, the mail server system transmits the E-mail to the requesting machine. Upon receiving the E-mail, the requesting machine indicates to the user that there is an incoming E-mail. In the example being described, the network facsimile apparatus 100 has an E-mail address to exchange E-mails as described above. The protocol is a POP (post office protocol), for example, to be applied for the communications from the CLs 103 and the network facsimile apparatus 100 to the SV 104 to request the incoming check as described above.

In the example being described, each of the CLs 103 has various application software programs including programs that are usually used by one or more users on an exclusive basis for exchanging various data such as E-mail with other terminals through the LAN 102 and for processing facsimile image information included in E-mail sent from the network facsimile 100.

When a user sees an indication of an E-mail arrival, the user can open the E-mail to check the contents. If the contents includes binary data such as facsimile image information, the user can initiate a program that can handle the binary data in an appropriate manner so as to see the contents. Typically, to view the binary data in E-mail the data is first transformed into a different data format, such as MIME (multi-purpose Internet mail extensions).

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Figure 2:
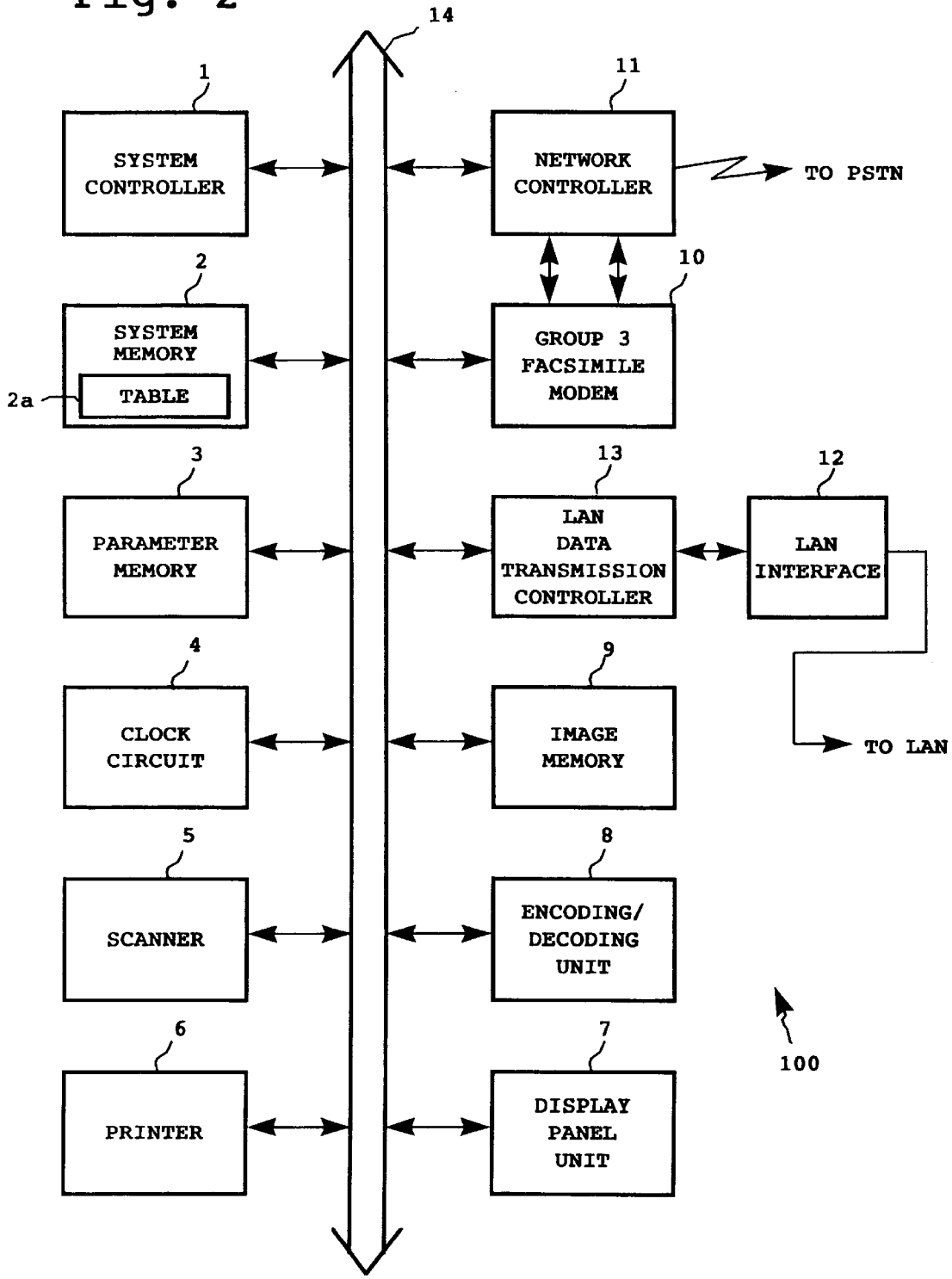
FIG. 2 is a block diagram of the network facsimile apparatus included in the electronic communications system of FIG. 1.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operation of the network facsimile apparatus 100 including a facsimile data transmission control for transmitting and receiving image information and arbitrary data files. The system memory 2 stores control (or application) programs to be performed by the system controller 1 and various kinds of data necessary for the execution of the control programs. In addition, the system memory 2 includes an address conversion table 2a, explained later, and a working memory area reserved for use of the system controller 1. The parameter memory 3 stores various kinds of parameters and information specific to the network facsimile apparatus 100. The clock circuit 4 generates information of the present time.

The scanner 5 reads an image of document at a predetermined resolution. The printer 6 produces an image output at a predetermined resolution. The display panel unit 7 includes various kinds of operational keys and indicators interfacing between an operator and the network facsimile apparatus 100.

The encoding/decoding unit 8 encodes an input image signal to compress the image information and decodes the compressed image information back into the input image signal and the transmission data memory 9 stores data including the compressed image data and data files to be transmitted.

The facsimile modem 10 is preferably a Group 3 facsimile modem that performs the functions of a modem for the Group 3 facsimile machine. The facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The network controller 11 has direct connections to the Group 3 facsimile modem 10. The network controller 11 includes an automatic transmitting and receiving function and controls the connection of the network facsimile apparatus 100 to the PSTN 120.

The LAN interface 12 is a communication interface between the LAN data transmission controller 13 and the LAN 102 located in the same domain as the network facsimile apparatus 100. The LAN data transmission controller 13 controls communications, using a predetermined protocol suite, for exchanging various kinds of data with other devices associated with the same domain as the facsimile apparatus 100, e.g. DM 101, via the LAN 102. The controller 13 can also control communications for exchanging various kinds of data with data terminal machines associated with other domains via the Internet 130.

The internal bus 14 is connected to all of the above-described units of the network facsimile apparatus 100, except for the LAN interface 12 which has a connection to the LAN data transmission controller 13. The bus 14 provides a medium for communications between the various units of the network facsimile apparatus 100.

In this way, one of the preferred structures of the network facsimile apparatus 100 is arranged.

Next, an example of the address conversion table 2a is explained with reference to FIG. 3. The address conversion table 2a stored in the system memory 2 contains a plurality of sub-addresses and corresponding E-mail addresses. Upon receiving a sub-address and facsimile image information sent from a sending facsimile machine, the network facsimile apparatus 100 determines the E-mail address of a destination CL 103 identified in the sub-address according to the address conversion table 2a. After the E-mail address is determined the facsimile image information is transmitted to the destination CL 103 via the LAN 102 and the SV 104 at the determined E-mail address.

As illustrated in FIG. 3, the address conversion table 2a has a plurality of rows in each of which a serial identification number 20, a destination sub-address 21, and a corresponding destination E-mail address 22 are aligned in combination. The destination sub-address 21 in this example may be a decimal number of up to 20-digit.

The destination E-mail addresses 22 in the address conversion table 2a basically correspond to a single user but they may also correspond to a so-called group addresses in which multiple E-mail addresses for multiple users are grouped. For example, when a destination E-mail address 22 represents a group address in the address conversion table 2a, the SV 104 stores multiple E-mail addresses for multiple users under that group address. Accordingly, any facsimile image information as well as E-mail having a group address instruction can be transmitted by the SV 104 to all the users registered under the group address at the SV 104.

Next, an exemplary procedure of adding a new E-mail address to the address conversion table 2a is explained with reference to FIG. 4. The user inputs a new E-mail address through the display panel unit 7 of the network facsimile apparatus 100 in Step S101 of FIG. 4. Then, the system controller 1 performs a sub-address generating process using a Hash functional operation in Step S102, in order to generate a sub-address that corresponds to the input E-mail address. After generation a new sub-address in Step S102, the system controller 1 checks if the address conversion table 2a already has the same sub-address or not in Step S104. In Step S105, the system controller 1 determines the check result of Step S104. If the check result is NO, meaning that the address conversion table 2a does not have the same sub-address, the system controller 1 adds the then input E-mail address and the newly generated sub-address in combination into the address conversion table 2a in Step S105. Then, the process ends. If the check result is YES, meaning that the address conversion table 2a already has the same sub-address, the system controller 1 performs an address conversion table reconstruction process in Step S106, so that the address conversion table 2a can be reconstructed and all the E-mail addresses can be assigned with their own unique sub-address. Then, the process ends.

In this way, the network facsimile apparatus 100 can adds a new E-mail address into the address conversion table 2a, through the sub-address generating process using the Hash functional operation.

Figure 4:
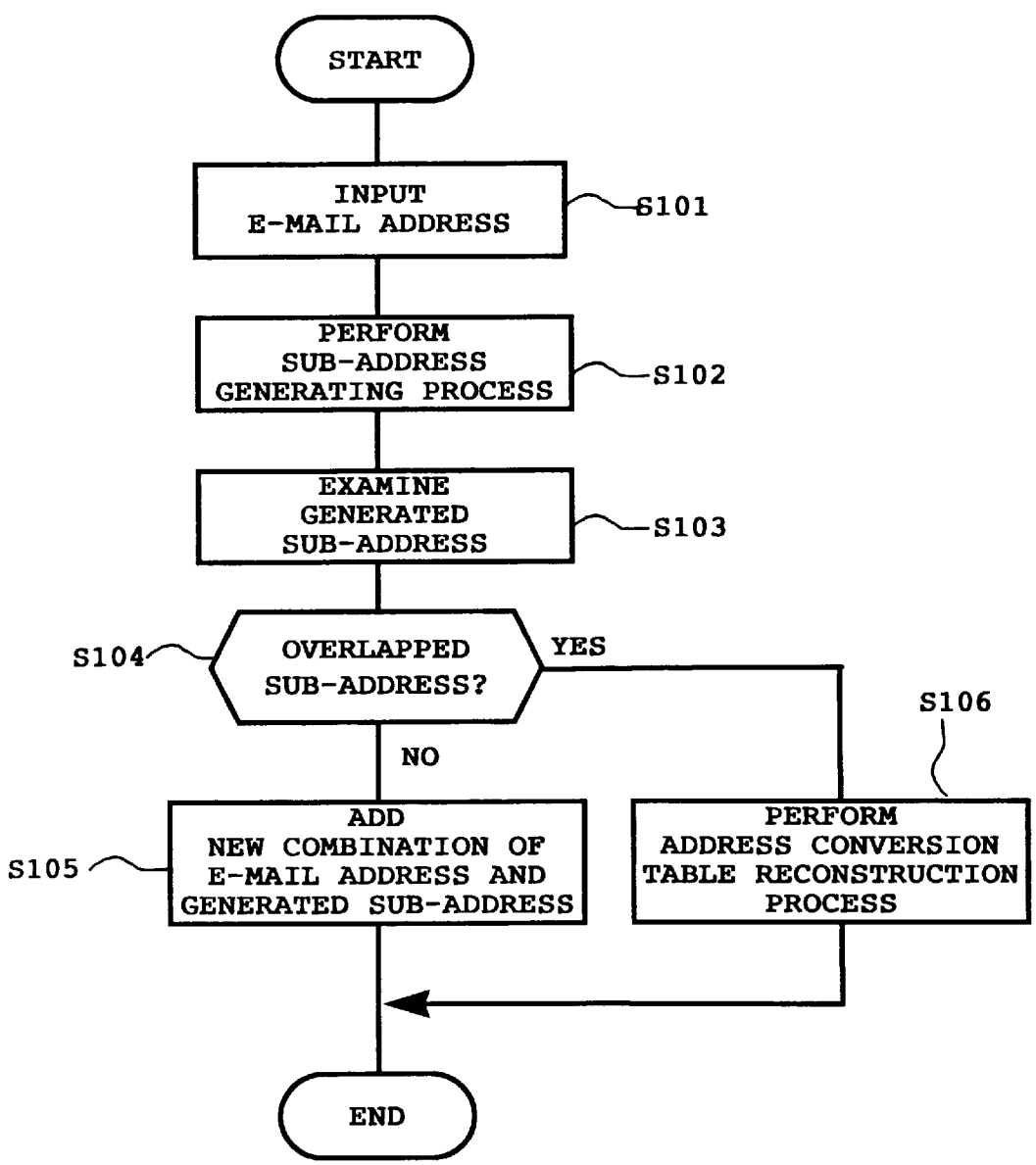
FIG. 4 is a flowchart of an exemplary procedure for adding a new electronic mail address performed by the network facsimile apparatus of FIG. 2.
Figure 5:
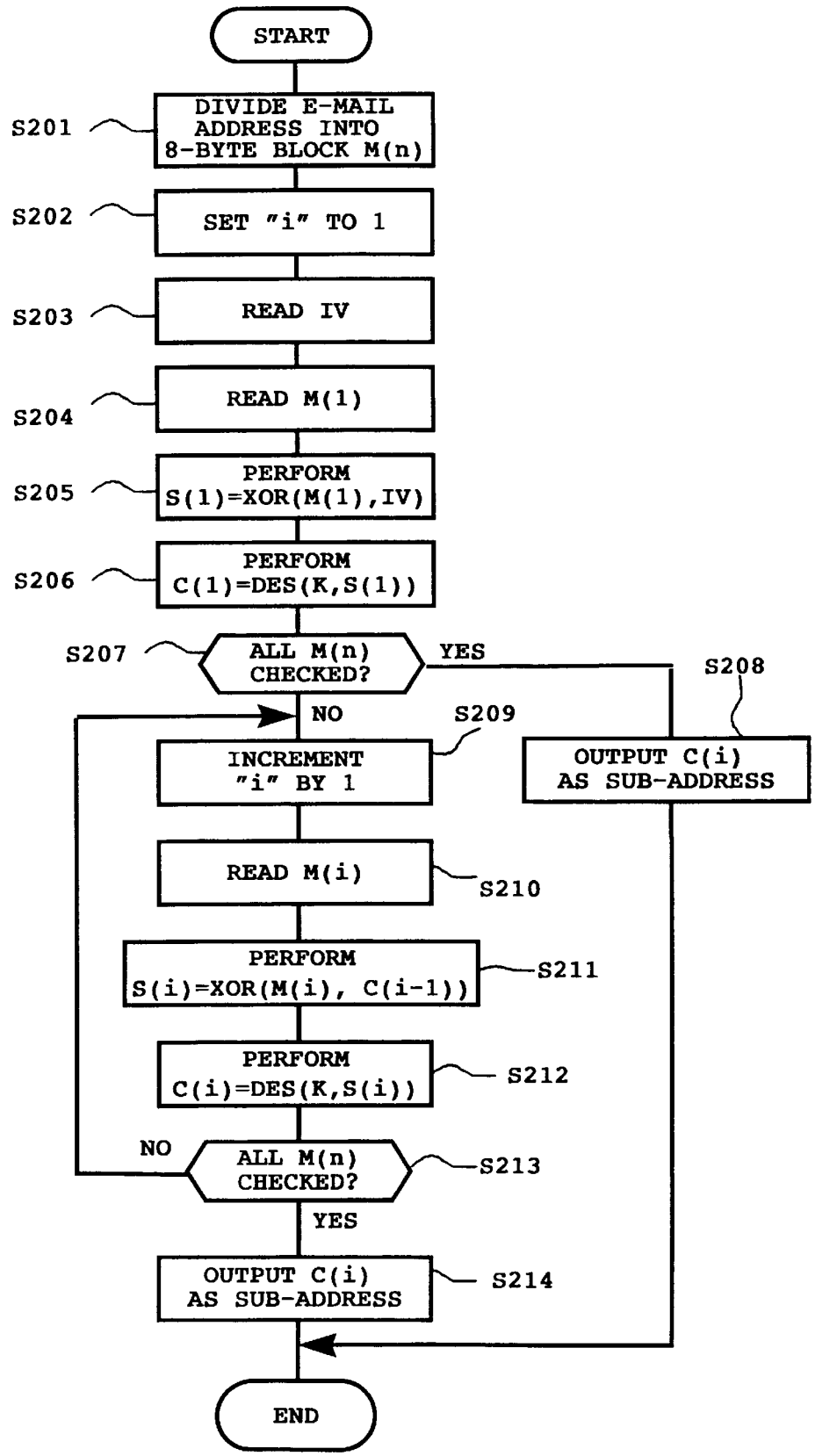
FIG. 5 is a flowchart of an exemplary sub-address generating process performed by the network facsimile apparatus of FIG. 2.

Next, an exemplary procedure of the sub-address generating process performed in Step S102 of FIG. 4 is explained with reference to FIG. 5. The sub-address generating process of FIG. 5 is to generate a sub-address under a CBC (cipher block chaining) mode of a DES (data encryption standard) which is defined by NFPS 77. In general, the algorithm of the data encryption process of the DES allows an input of a plain text in a 64-bit data unit and generates an encrypted text made in a 64-bit data unit under a control of 56-bit key information which will be of 64-bit data if an inspection sign is added. In the CBC mode, an encryption cycle is successively repeated in which an encrypted text block having a 64-bit length is processed with the next input plain text in a 64-bit length via an exclusive OR operation so that encrypted next input text is created, and as a result a complete encrypted text is output. During the first cycle of encryption in the CBC mode, a plain text having a 64-bit length is processed with a predetermined initial value (IV).

In Step S201 of FIG. 5, the system controller 1 divides the input E-mail address into a plurality of 8-byte data blocks, each of which is a unit to be processed by the DES operation. The system controller 1 sets a counter "i" to 1 in Step S202 and reads a predetermined initial value (IV) in Step S203. The system controller 1 reads the first of the plurality of 8-byte data blocks which is referred to as data M(1), in Step S204. The system controller 1 processes the data M(1) and the initial value (IV) with an exclusive OR operation and assigns the process result into a variant S(1), in Step S205. Then, the system controller 1 performs the DES operation to encrypt the S(1) using a key K that is a fixed predetermined value and assigns the encryption result into a variant C (1), in Step S206.

Then, in Step S207, the system controller 1 determines if all the data (e.g., bytes 1–8) of the input E-mail address has been processed with the DES operation. When the input E-mail address has only an 8-byte data length, the determination result of Step S207 is YES and, in Step S208, the system controller 1 outputs the C(1) as a sub-address. The process then ends.

Converting the 64-bit binary value resulted from the DES operation into decimal makes a 20-digit decimal number which can be fit in a digit number of sub-address. Therefore, the output of the DES operation can be used as a sub-address. If the variant C(1) which is an output of the DES operation has 0-valued bits between the most significant bit and a first integer other than 0, these 0-valued bits are omitted. The resultant variant C(1) is output as a sub-address.

When the input E-mail address is longer than an 8-byte data length, the determination result of Step S207 is NO and the system controller 1 increments the variant "i" by 1 in Step S209 and reads data M(i) of an "i"th block in Step S210. At this time, the variant C(i-1) stores an immediately previous output of the DES operation. Therefore, in Step S211, the system controller 1 processes the data M(i) and the data C(i-1) with the exclusive OR operation and assigns the operation result into the variant S(i). Then, the system controller 1 performs the DES operation to encrypt the S(i) using the key K and assigns the encryption result into a variant C (i), in Step S212.

Then, the system controller 1 checks if all the data of the input E-mail address are processed with the DES operation or not in Step S213. If the DES operation has not been completed yet on all the data of the input E-mail address and the check result of Step S213 is NO, the process returns to Step S209 so as to perform the next encryption cycle. If the DES operation has been completed on all the data of the input E-mail address and the check result of Step S213, the check result of Step S213 is YES and the system controller 1 sets the value of the variant C(i) as a sub-address in Step S214. At this time, if the variant C(i) has 0-valued bits between the most significant bit and a first integer other than 0, these 0-valued bits are omitted. The resultant variant C(i) is output as an appropriate sub-address.

Thus, the network facsimile apparatus 100 can generate a sub-address in accordance with an input E-mail address through the exemplary procedure of the sub-address generating process which is performed in Step S102 of FIG. 4. Although the above described example uses the DES system as one application of the Hash functional operation, other applications that operate in a manner similar to the Hash system may also be applied.

Figure 6:
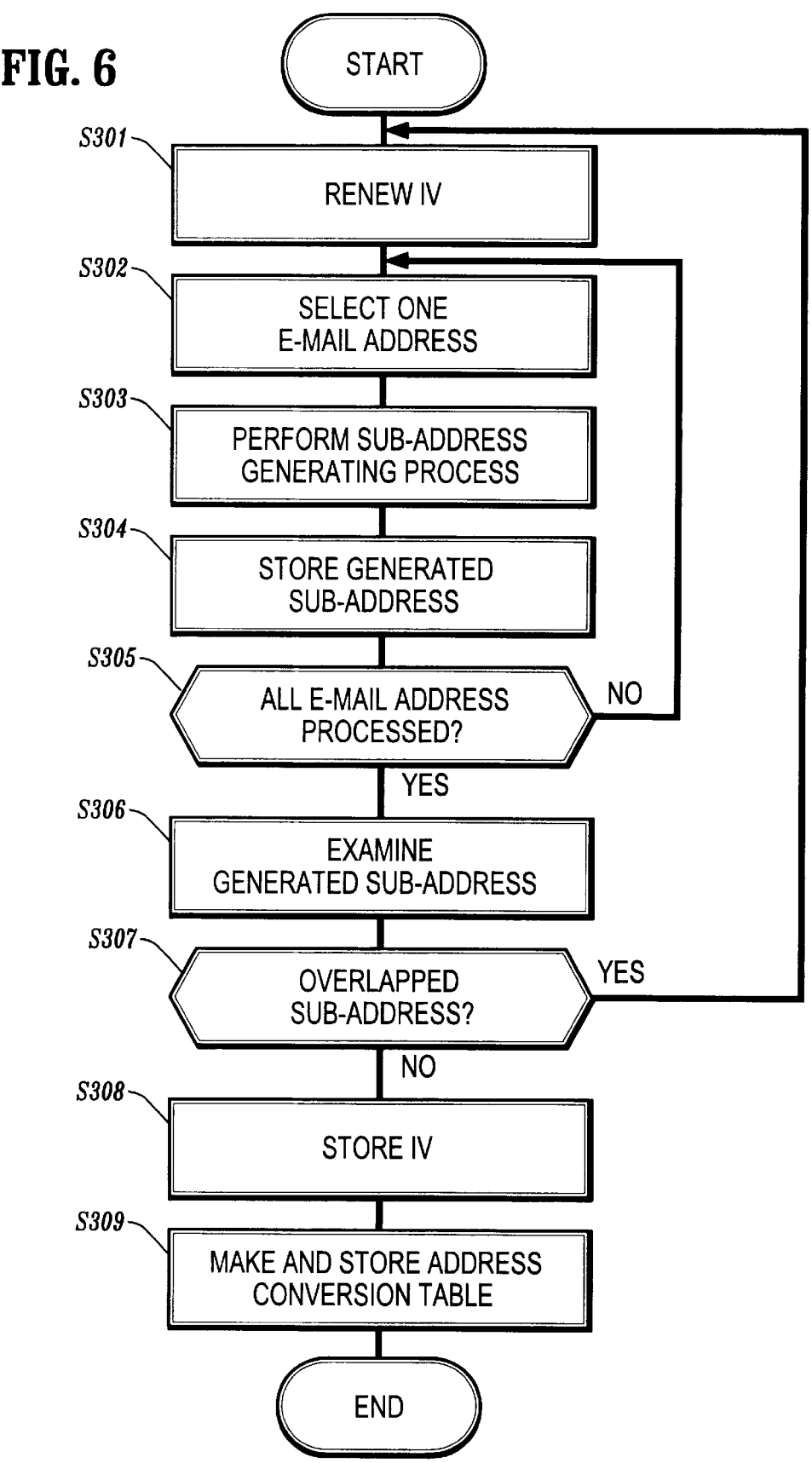
FIG. 6 is a flowchart of an exemplary address conversion table reconstruction process performed by the network facsimile apparatus of FIG. 2.

Next, an exemplary procedure of the address conversion table reconstruction process performed in Step S106 of FIG. 4 is explained with reference to FIG. 6. In Step S301 of FIG. 6, the system controller 1 renews the predetermined initial value IV by adding 1, for example. Then, the system controller 1 selects one arbitrary E-mail address in Step S302 and performs the above-described sub-address generating process using the renewed IV, the selected E-mail address, and the key K in Step S303. The resultant value is regarded as a sub-address and temporarily stored together with the selected E-mail address in Step S304. Then, in Step S305, the system controller 1 checks if all the E-mail addresses registered in the address conversion table 2a have been processed. If all the E-mail addresses registered in the address conversion table 2a have not been processed and the check result of Step S305 is NO and the process returns to Step S302 so that the next E-mail address is selected and the process is repeated.

If all the E-mail addresses registered in the address conversion table 2a has have been processed and the check result of Step S305 is YES, the process proceeds to Step S306 and the system controller 1 examines if there is an overlap among the sub-addresses which have been temporarily stored. Then, in Step S307, the system controller 1 determines whether or not there is an overlap in the sub-addresses. When the determination result of Step S307 is YES, meaning that there is an overlap, the process proceeds to Step S301 and the system controller 1 changes the IV to restart the sub-address generating operation.

When the determination result of Step S307 is NO, meaning that there is no overlap, the system controller 1 stores the then-used IV in Step S308 and creates a new address conversion table, in Step S309, in accordance with the information of the temporarily stored sub-address combined with the selected E-mail address. Then, the process ends.

In this way, the network facsimile apparatus 100 can reconstructs the address conversion table, e.g. the address conversion table 2a, through the address conversion table reconstruction process.

Figure 7:
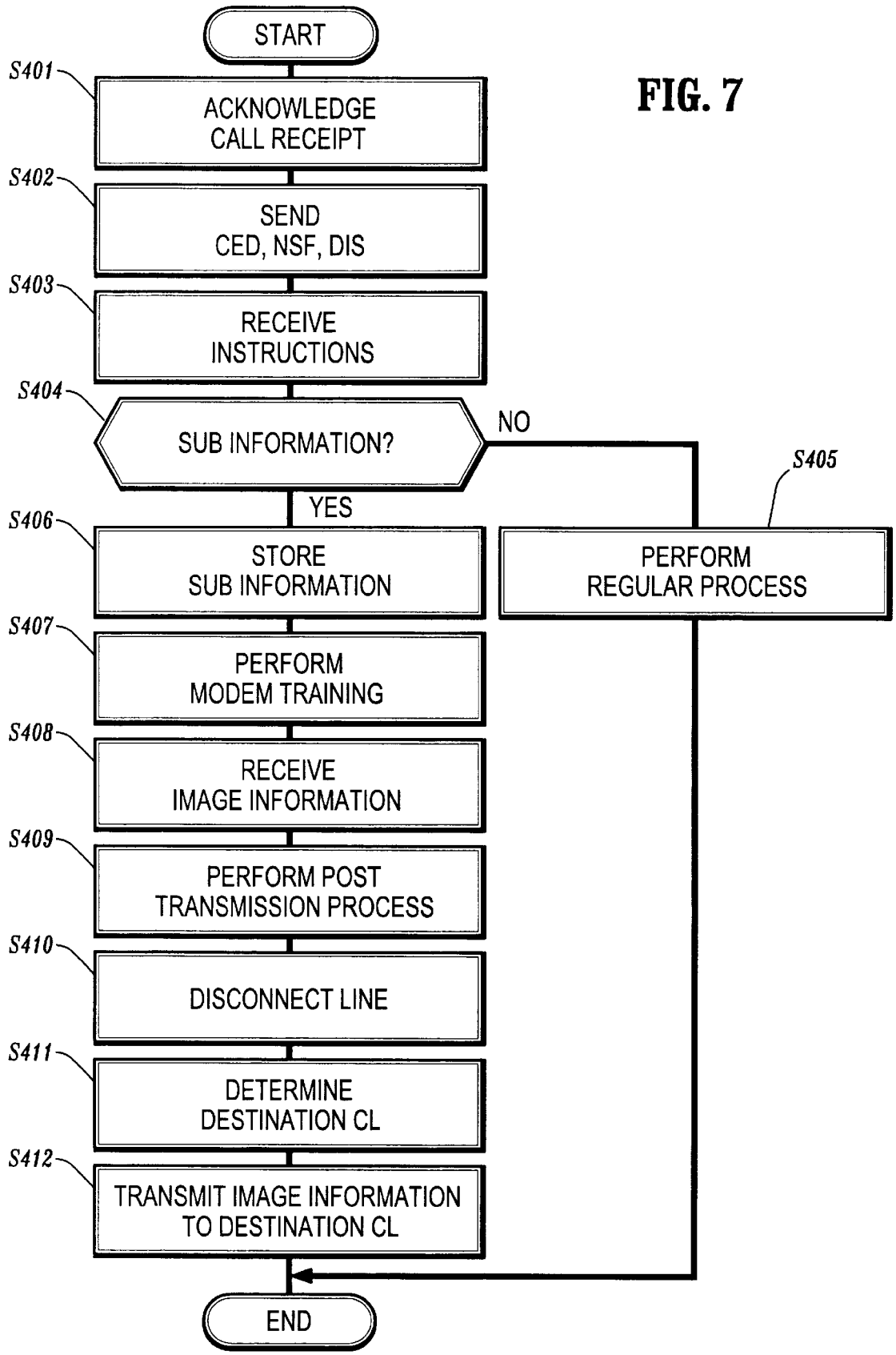
FIG. 7 is a flowchart of an exemplary call receiving operation performed by the network facsimile apparatus of FIG. 2.

Next, a description of the operation of the network facsimile apparatus 100 of a domain is explained with reference to FIG. 7. This exemplary description is based on the network facsimile apparatus receiving a call followed by facsimile image information addressed to a destination CL 103 of the same domain, which is sent from a communications terminal, such as the FAX 121, over the PSTN 120. Upon receiving such a call from the FAX 121, the system controller 1 controls the network controller 11 to acknowledge the call in Step S401 of FIG. 7. Further, the network controller 11 arranges (in step S402) to send various handshaking signals back to the sending communication terminal, here FAX 121. The various signals may include a CED signal (called station identification) for identifying that a called machine is a facsimile machine, an NSF signal (non-standard facilities) for indicating execution of non-standard functions, and a DIS signal (digital identification signal) for specifying the information receiving ability of the called machine, such as an available recording sheet size. The NSF includes an information field indicating the value of the IV which is stored together with the associated address conversion table 2a.

The system controller 1 then receives various instructions from the FAX 121 via the network controller 11 in Step S403 and examines if the instructions includes a sub-address signal SUB which includes a sub-address of the destination CL 103, in Step S404. When the received instructions do not include a sub-address signal and the examination result of Step S404 is NO, the system controller 1 controls the network controller 11 to perform a regular call receiving process in Step S405. Then, the process ends.

When the received instructions include a sub-address signal and the examination result of Step S404 is YES, the system controller 1 stores the received sub-address in Step S406. Then, in Step S407, the system controller 1 controls the Group 3 facsimile modem 10 to perform a general modem training process and to determine its communication speed. The system controller 1 controls the network controller 11 to receive facsimile image information through the facsimile image communication procedure in Step S408, to perform a predetermined post-communications process upon completing communications in Step S409, and to disconnect the line in Step S410.

Then, in Step S411, the system controller 1 examines a sub-address included in the received SUB signal with the sub-addresses in the address conversion table 2a to determine the corresponding E-mail address of the destination CL 103. Upon determining the corresponding E-mail address of the destination CL 103, the system controller 1 transmits the facsimile image information to the destination CL 103 through the E-mail operation in step S412.

In this way, the network facsimile apparatus 100 can determine an appropriate E-mail address based on the received sub-address and the previously stored address conversion table so as to relay the received facsimile image information to a destination CL 103 of the same domain, upon receiving the information from a communications terminal over the PSTN 120.

Next, an exemplary operation of a communications terminal, such as the FAX 121, used to transmit facsimile image information to a CL 103 via the network facsimile apparatus 100 is explained with reference to FIGS. 8 and 9. The communications terminal to transmit facsimile image information can be other Group 3 facsimile machines, such as FAX 122. It should be noted that facsimile machines other than Group 3 facsimile machines are contemplated.

However, in this exemplary communication terminal operation being described, the FAX 121, for example, is capable of performing the above-described sub-address generating process so that users can directly input an E-mail address of an arbitrary destination CL 103. FIG. 8 illustrates a block diagram of the FAX 121, which is similar to that of the network facsimile apparatus 100, except the FAX 121 includes neither the address conversion table 2a, the LAN interface 12, nor the LAN data transmission controller 13. Therefore, in describing the FAX 121, each element that corresponds to an element described with reference to FIG. 2 is provided with the same reference numeral, and repetitions of the same description for the elements are omitted.

Figure 8:
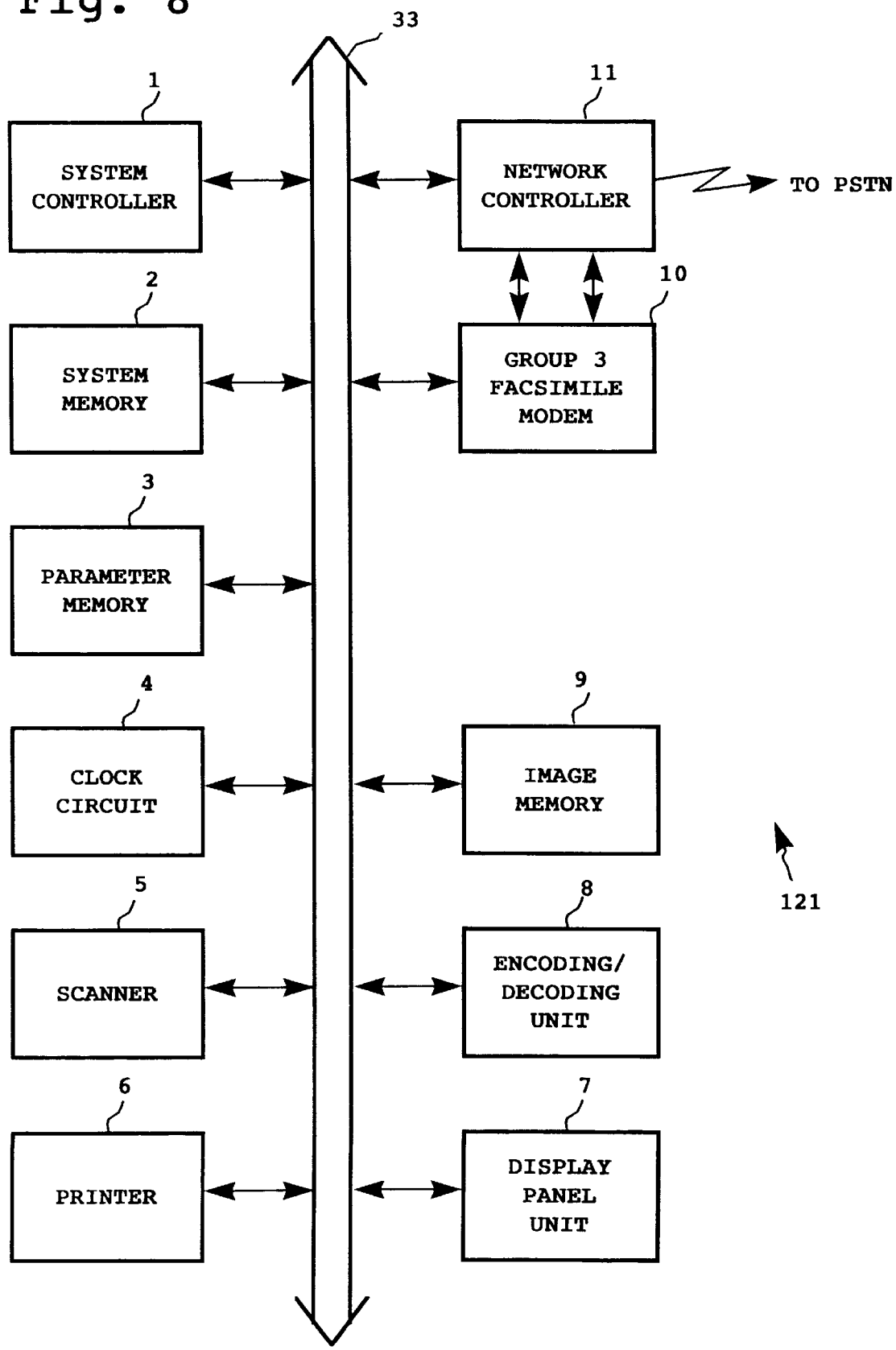
FIG. 8 is a block diagram of a destination Group 3 facsimile machine included in the electronic communications system of FIG. 1.
Figure 9:
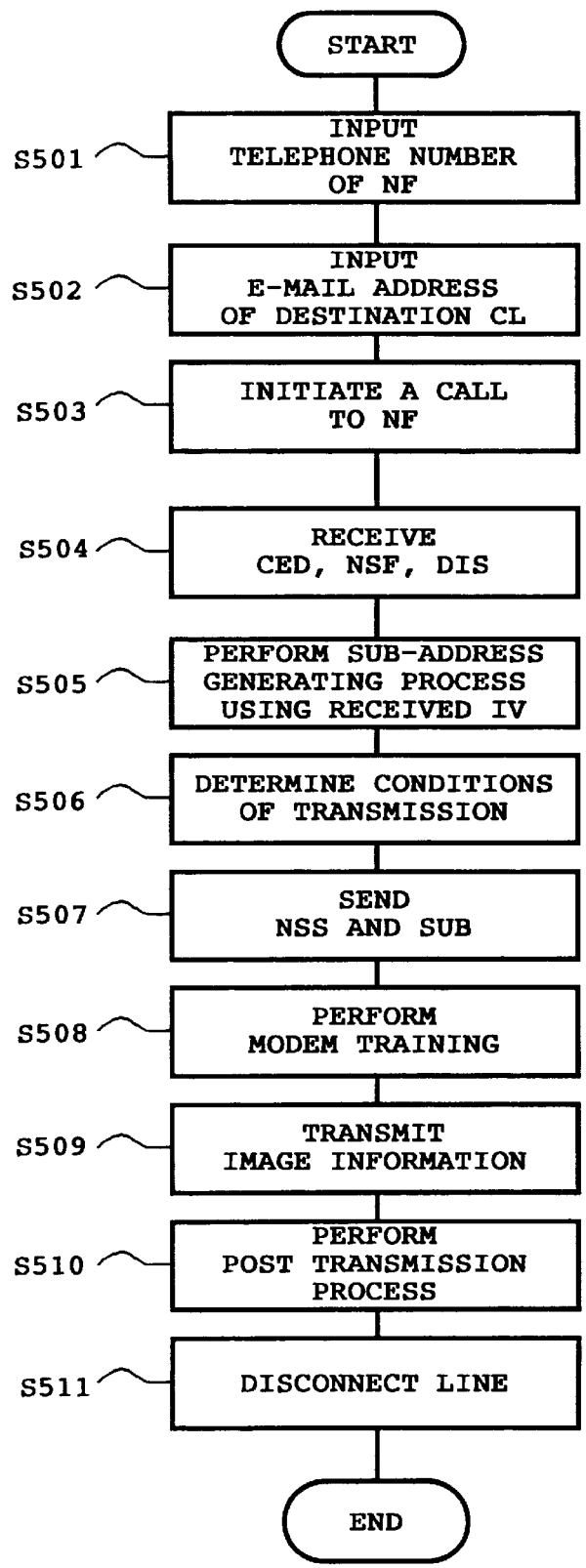
FIG. 9 a flowchart of an exemplary calling operation performed by the destination Group 3 facsimile machine of FIG. 8.

Referring now to FIG. 9, a description of the operation of the FAX 121 of FIG. 8 is provided. To send a facsimile to a domain, e.g., DM 101, in Step S501, a user inputs through the display panel unit 7 a telephone number of a relay station, such as the network facsimile apparatus 100 of the DM 101. At this time, the network facsimile apparatus 100 of the DM 111 can alternatively be a relay station. Then, the user further inputs an E-mail address of a destination CL 103 in Step S502, and upon this input a call is initiated to the network facsimile apparatus 100 of the DM 101 in Step S503. In Step S504, the system controller 1 of the FAX 121 receives acknowledging signals including the CED (called station identification), NSF (non-standard facilities), and DIS (digital identification signal).

Then, in Step S505, the system controller 1 of the FAX 121 generates a sub-address of the desired destination CL 1003 by performing the sub-address generating process discussed above using the initial value (IV) which is included in the NSF, the input E-mail address, and the key information. Further, the system controller 1 of the FAX 121 controls the network controller 11 and the Group 3 facsimile modem 10 (seen in FIG. 8) to establish communications conditions in Step S506 and to transmit various signals, in Step S507, including an NSS (non-standard facilities set up) for notifying a called station of transmission functions to be used, a SUB (sub-address) for notifying the called station of a sub-address of the calling station.

Then, the system controller 1 of the FAX 121 controls the network controller 11 and the Group 3 facsimile modem 10 to perform a modem training procedure in Step S508 and to transmit the facsimile image information to the network facsimile apparatus 100 of the DM 101 in Step S509. Upon completing the information transmission, the system controller 1 of the FAX 121 controls the network controller 11 and the Group 3 facsimile modem 10 to perform a post communication procedures in Step S510 and to release the line in Step S511.

In this way, users can transmit facsimile image information to a desired destination CL 103 via the network facsimile apparatus 100 by calling the network facsimile apparatus 100 and by inputting directly an E-mail address of the destination CL 103 instead of its sub-address.

In the above-described example, both the FAX 121 and the network facsimile apparatus 100 employ the same DES encryption function operable in its CBC mode. In the network facsimile apparatus 100, the DES encryption function converts E-mail addresses into the corresponding sub-addresses when an address conversion table, e.g. the address conversion table 2a, is created and when a new E-mail address is registered. In the FAX 121, with referring to the parameter information provided by the network facsimile apparatus 100, the DES system converts an E-mail address into a corresponding sub-address when a user enters the E-mail address to send facsimile image information to a desired destination CL 103 which has that E-mail address.

Because of this feature, a user's input of E-mail address can be converted into a corresponding sub-address that is equal to the one that has been generated by the DES system at the network facsimile apparatus 100.

In addition, each network facsimile apparatus 100 has its own unique address conversion table 2a, since the table may include different client terminals from those of other tables pertained to other machines. Therefore, the above-described appropriate linkage between the user's input of E-mail address and a sub-address that has been generated by the DES system at the network facsimile apparatus 100 can be made regardless of the facsimile machine, e.g., FAX 121, the user is calling from and the network facsimile apparatus 100 the user is calling to.

Further, the above described feature greatly helps users at the sending communication terminals side, particularly in instances where a user has an account for his CL 103 at a plurality of the network facsimile apparatus 100 each of which belongs to a different domain. This case relates to instances in conventional systems where users were required to use a different sub-address having an approximately 20-digit number that depended upon which one of the plurality of the network facsimile apparatus 100 the users made a call.

However, with the system according to the present application described, an entry of a single E-mail address uniquely assigned to the user of the destination CL 103 can be converted into a corresponding sub-address that is equal to the one that has been generated by the DES system at the called network facsimile apparatus 100, regardless of which one of the network facsimile apparatus 100 the user is calling to.

Next, an exemplary procedure of examining if an E-mail address is properly entered at a communication terminal is explained with reference to FIG. 10. This procedure avoids erroneous operation of the sub-address generating process which may be caused by an improper entry of E-mail address.

Figure 10:
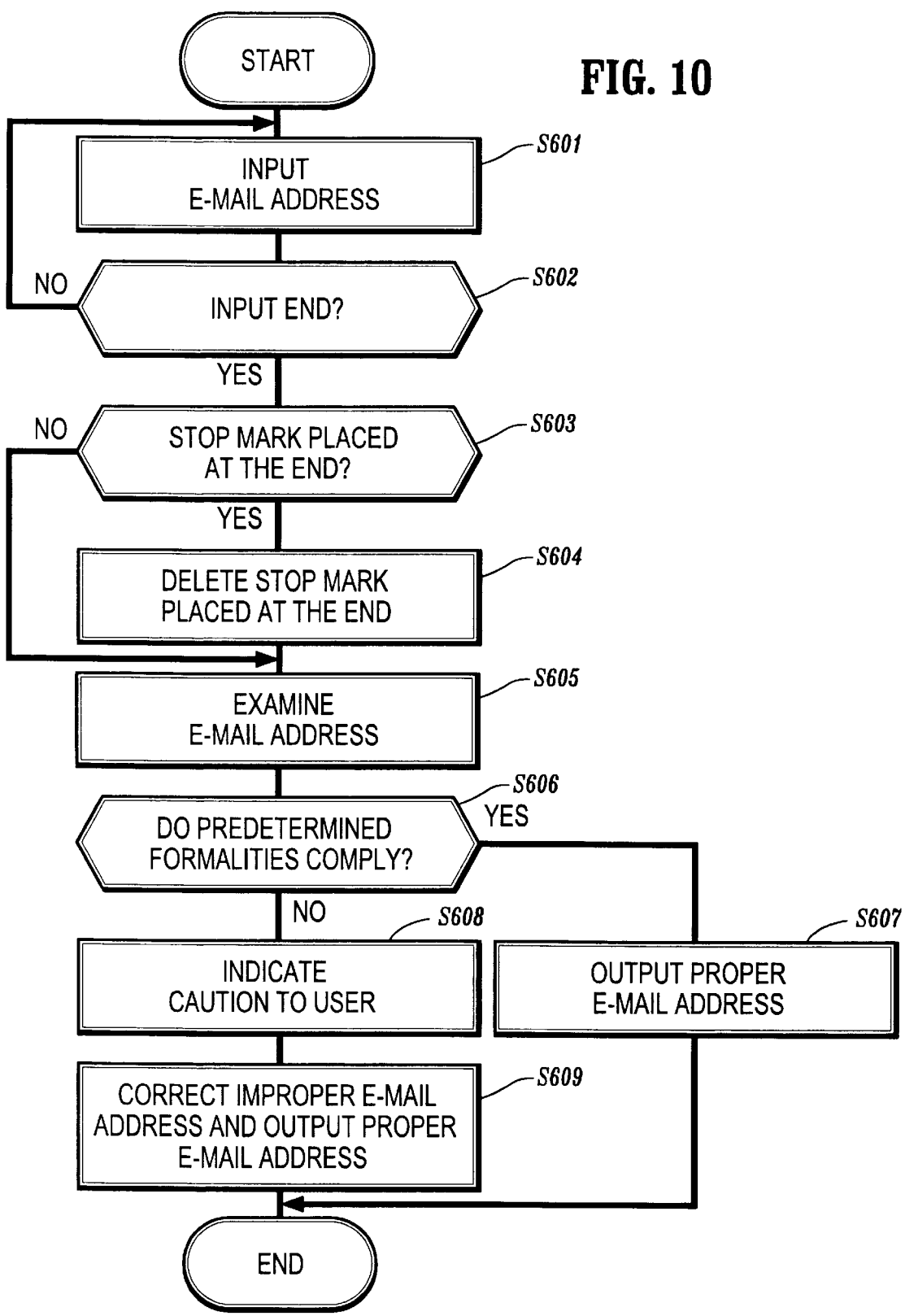
FIG. 10 is a flowchart of an exemplary E-mail address input check operation performed by the destination Group 3 facsimile machine of FIG. 8.

By Steps S601 and S602 of FIG. 10, a user's input of E-mail address is monitored. Upon a completion of an input of an E-mail address by the user, the check result of Step S602 is YES and the process proceeds to Step S603. In Step S603, the system controller I of the FAX 121 examines in Step S603 if a stop mark is placed at the end of the input E-mail address and a high level domain name, such as a country name, is placed immediately before the stop mark. When a stop mark is placed at the end of the input E-mail address and a high level domain name is placed immediately before the stop mark, the examination result of Step S603 is YES, and the process proceeds to Step S604 where the system controller 1 of the FAX 121 modifies the E-mail address by deleting the stop mark placed at the end of the input E-mail address. Then, in Step S605, the system controller 1 checks formalities of the modified E-mail address. In Step S606, the system controller 1 determines whether the check result complies with predetermined formalities. When the check result complies with the predetermined formalities the determination result of Step S606 is YES, the process proceeds to Step S607 where the system controller 1 regards the modified E-mail address as an appropriate E-mail address. Then, the process ends.

When the check result does not comply with the predetermined formalities the determination result of Step S606 is NO, and the process proceeds to Step S608 and where the system controller 1 controls the display panel unit 7 to indicate a caution (e.g., incorrect E-mail address) to the user. Then, in Step S609, the system controller 1 of the FAX 121 performs an E-mail address re-input process that instructs users to input the correct E-mail address and that regards the re-input E-mail address as a correct E-mail address. Then, the process ends.

In this way, the Fax 121 can avoid an erroneous operation of the sub-address generating process caused by an improper entry of E-mail address.

Figures 11, 12:
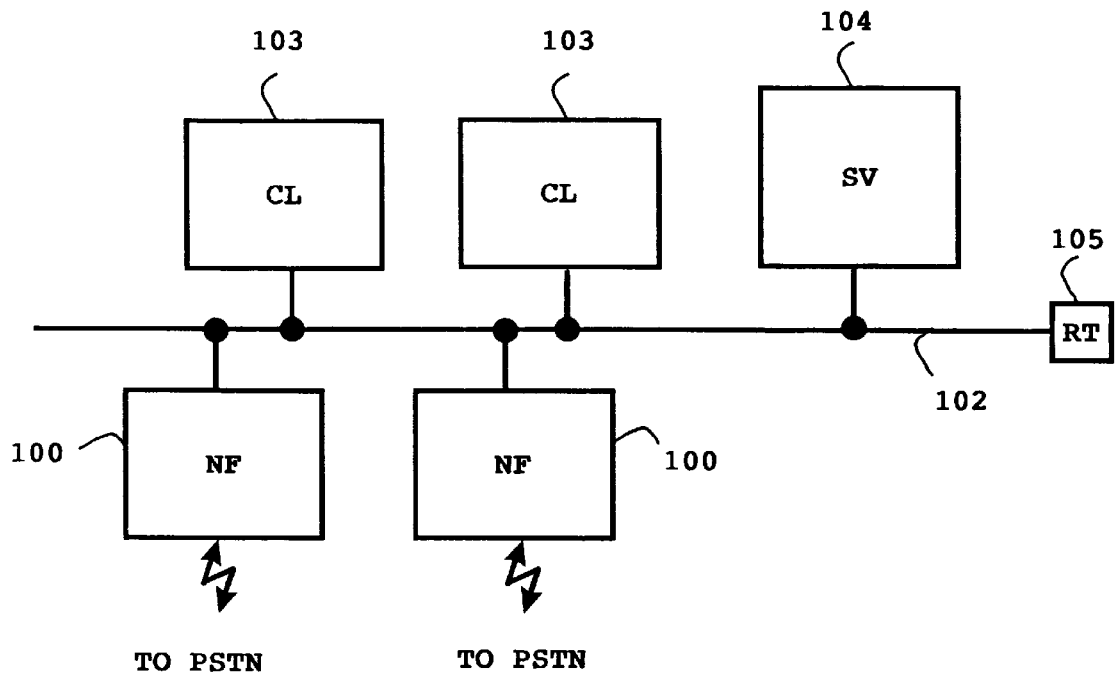
FIG. 11 is a block diagram of a modified domain included in the electronic communications system of FIG. 1.
FIGS. 12 is a table representing another relationship between a serial number, a sub-address, and a corresponding electronic mail address.

In the above examples, the user has an account for his CL 103 at a plurality of the network facsimile apparatus 100, each of which belongs to a different domain, such as DM 101 or DM 111. However, this application can also be applied to a case where the user has an account for his CL 103 at a plurality of the network facsimile apparatus 100, each of which belongs to the same domain, as illustrated in FIG. 11. FIG. 11 illustrates a domain that has a configuration similar to that of the DMs 101 and 111, except for the addition of a second network facsimile 100. In such a case, the entry of a single E-mail address uniquely assigned to the user of the destination CL 103 can be converted into a corresponding sub-address that is equal to the one that has been generated by the DES system at the called network facsimile apparatus 100, regardless of which one of the network facsimile apparatus 100 the user is calling to.

Figure 13:
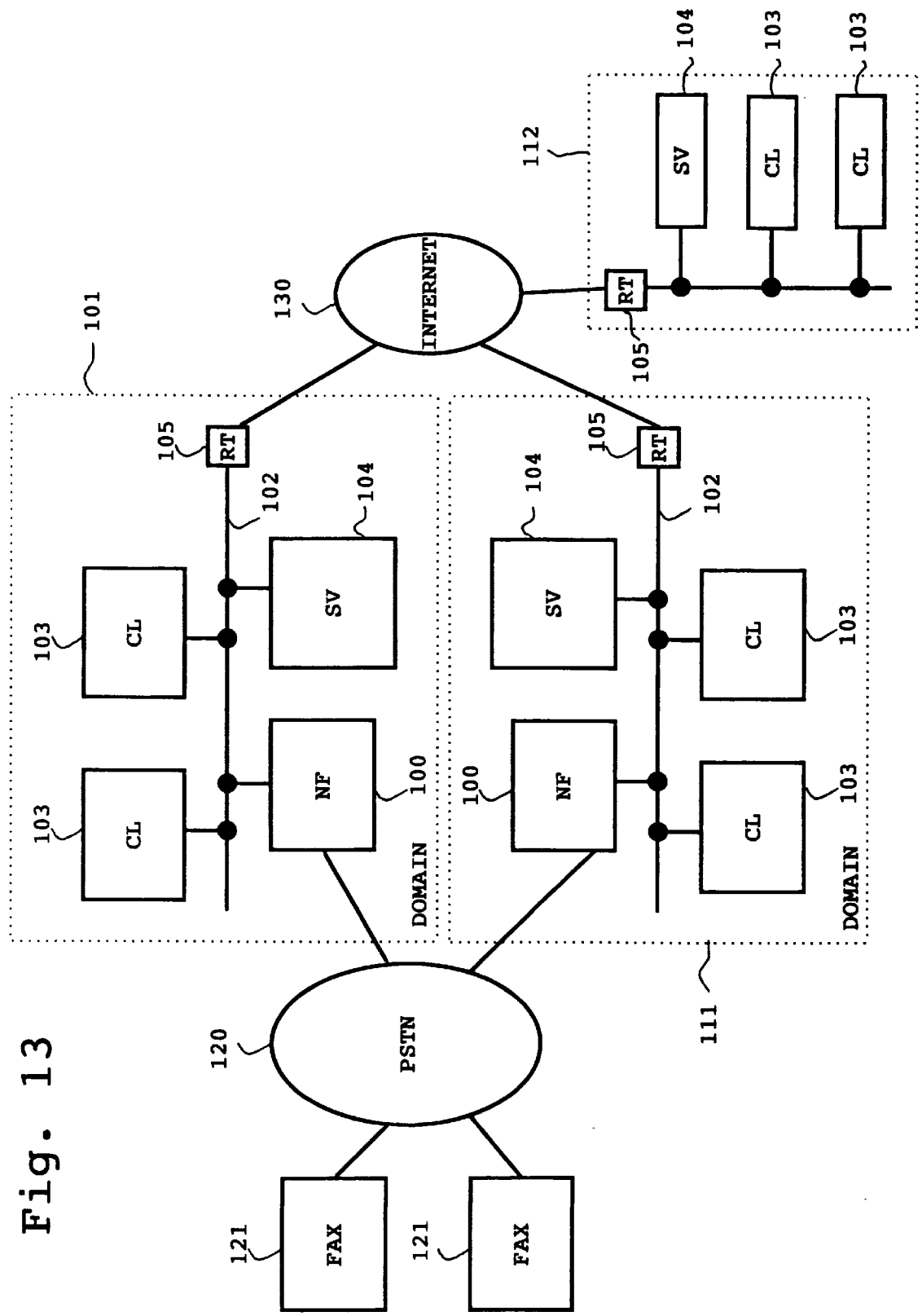
FIG. 13 is a block diagram of a modified electronic communications system including a network facsimile apparatus according to the present application.

In addition, the network facsimile apparatus 100 can generate an address conversion table 2b, illustrated in FIG. 12, alternative to the address conversion table 2a. While the address conversion table 2a includes only the CLs 103 within the same domain, e.g. the DM 101, the address conversion table 2b can be configured to include the CLs 103 of other domains, for example, DMs 101 and 111. That is, in a case where an electronic communications system is arranged similar to the above described system of FIG. 1 but with an additional domain 112, as illustrated in FIG. 13, entry of a single E-mail address, uniquely assigned to the user of the destination CL 103, at the FAX 121 can be converted into a corresponding sub-address that is equal to the one that has been generated by the DES system at the called network facsimile apparatus 100, regardless of which one of the network facsimile apparatus 100 the user is calling to and which one of the domains the destination CL 103 is belongs to.

The embodiments of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

The present application is based on Japanese Application No. 9-142912 filed in the Japanese Patent Office on May 19, 1997, and the entire contents of which are incorporated herein by reference.

What is claimed is:

1. An electronic communications system, comprising:
a sending facsimile terminal connected to a public switched telephone network; and
a plurality of domains each including:
at least a destination client terminal connected to a local area network; and
at least a relaying data terminal connected to said destination client terminal via the local area network and connected to the sending facsimile terminal via the public switched telephone network;
wherein said relaying data terminal includes:
a first sub-address generator configured to generate a sub-address based on an electronic mail address;
a data table generator configured to generate an address conversion table that correlates a plurality of sub-addresses generated by said first sub-address generator to corresponding electronic mail addresses such that each of said plurality of sub-addresses is uniquely coupled with a corresponding electronic mail address that is uniquely assigned to said destination client terminal;
a memory storing said address conversion table; and
a terminal controller checking an incoming call from said sending facsimile machines containing facsimile image information and a sub-address representing said destination client terminal, and upon receiving such incoming facsimile image information and sub-address said controller determines an electronic mail address corresponding to said received sub-address using said address conversion table and relays said facsimile image information to said destination client terminal at said determined electronic mail address; and
wherein said sending facsimile terminal includes:
a second sub-address generator configured to generate a sub-address based on an electronic mail address for a destination client terminal; and
a facsimile controller controlling the transmission of facsimile image information and the sub-address generated by said second sub-address generator to said relaying data terminal.

2. The electronic communications system according to claim 1, wherein said first and second sub-address generators use a Hash functional operation to generate said sub-address in decimal representation having a number of digits determined by a number of characters contained in said electronic mail addresses.

3. The electronic communications system according to claim 1, wherein said first and second sub-address generators use data encryption standards to generate said sub-addresses.

4. The electronic communications system according to claim 1, wherein said sending facsimile terminal further comprises an electronic mail address form checker that checks if said electronic mail address for a destination client terminal has a proper electronic mail address form such that when an improper formed electronic mail address is found said form checker provides an indication of an improper electronic mail address and stops further operations.

5. An electronic communications system, comprising:
 a plurality of facsimile terminals connected to a public switched telephone network, including a sending facsimile terminal; and
 a plurality of domains each including:
  a plurality of client terminals connected each other via a local area network, including a destination client terminal; and
  at least one data terminal, including a relaying data terminal, connected to said plurality of client terminals via the local area network and to the plurality of facsimile terminals via the public switched telephone network; and wherein at least said relaying data terminal, includes:
   a first sub-address generator configured to generate a sub-address based on an operator entered electronic mail address and a predetermined functional operation method using a predetermined reference value;
   a data table generator configured to generate an address conversion table that correlates a plurality of sub-addresses generated by said first sub-address generator to corresponding electronic mail addresses such that each of said plurality of sub-addresses is uniquely coupled with a corresponding electronic mail address that is uniquely assigned to said destination client terminal;
   a memory storing said address conversion table; and
   a terminal controller that controls the transmission of said predetermined reference value to said sending facsimile terminal upon receiving an incoming call from said sending facsimile terminal, that checks an incoming call containing facsimile image information and a sub-address representing said destination client terminal, and upon receiving such incoming facsimile image information and sub-address, said controller determines an electronic mail address corresponding to said received sub-address using said address conversion table and relays said facsimile image information to said destination client terminal at said determined electronic mail address, and said controller examines whether said sub-address generated by said first sub-address generator is equal to any one listed in said address conversion table, and when said sub-address generated by said first sub-address generator is equal to one listed in said address conversion table, said controller changes said predetermined reference value to recalculate said sub-address, such that said newly generated sub-address is different from any one listed in said address conversion table; and
  wherein at least said sending facsimile terminal includes:
   a second sub-address generator configured to generate a sub-address based on a operator entered electronic mail address and said predetermined functional operation method using said reference value; and
   a facsimile controller controlling the transmission of facsimile image information and the sub-address generated by said second sub-address generator to said relaying data terminal.

6. The electronic communications system according to claim 5, wherein said first and second sub-address generators use a Hash functional operation to generate said sub-address in decimal representation having a number of digits determined by a number of characters contained in said operator entered electronic mail addresses.

7. The electronic communications system according to claim 5, wherein said first and second sub-address generators use data encryption standards to generate said sub-addresses.

8. The communication system according to claim 5, wherein said predetermined reference value is key information.

9. The communication system according to claim 5, wherein said predetermined reference value is an initial value which is used in the initial process of the predetermined functional operation method.

10. The electronic communications system according to claim 5, wherein at least said sending facsimile terminal further comprises an electronic mail address form checker that checks if said operator entered electronic mail address for a destination client terminal has a proper electronic mail address form such that when an improper formed electronic mail address is found, said form checker provides an indication of an improper electronic mail address entry and stops further operations.

11. An electronic communications system, comprising:
 a sending facsimile terminal connected to a public switched telephone network; and
 a plurality of domains each including:
  at least a destination client terminal connected to a local area network; and
  at least a relaying data terminal connected to said destination client terminal via the local area network and to the sending facsimile terminal via the public switched telephone network;
  wherein said relaying data terminal includes:
   first sub-address generating means for generating a sub-address based on an electronic mail address;
   data table generating means for generating an address conversion table that correlates a plurality of sub-addresses generated by said first sub-address generating means to corresponding electronic mail addresses such that each of said plurality of sub-addresses is uniquely coupled with a corresponding electronic mail address that is uniquely assigned to said destination client terminal;
   data storing means for storing said address conversion table; and
   terminal controlling means for checking an incoming call from one of said plurality of facsimile machines containing facsimile image information and a sub-address representing said destination client terminal, and upon receiving such incoming facsimile image information and sub-address said controlling means determines an electronic mail address corresponding to said sub-address using said address conversion table and relays said facsimile image information to said destination client terminal at said determined electronic mail address; and wherein said sending facsimile terminal includes:
second sub-address generating means for generating a sub-address based on an electronic mail address for said destination client terminal; and
facsimile controlling means for controlling transmission of facsimile image information and the sub-address generated by said second sub-address generating means to said relaying data terminal.

12. The electronic communications system according to claim 11, wherein said first and second sub-address generating means use a Hash functional operation for generating said sub-address in decimal representation having a number of digits determined by a number of characters contained in said electronic mail addresses.

13. The electronic communications system according to claim 11, wherein said first and second sub-address generating means use data encryption standards for generating said sub-address.

14. The electronic communications system according to claim 11, wherein said each of said sending facsimile terminal further comprises an electronic mail address form checker that checks if an electronic mail address for a destination client terminal has a proper electronic mail address form such that when an improper formed electronic mail address is found said form checker provides an indication of an improper electronic mail address and stops further operations.

15. An electronic communications system, comprising:
a plurality of facsimile terminals connected to a public switched telephone network, including a sending facsimile terminal; and
a plurality of domains each including:
a plurality of client terminal connected each other via a local area network, including a destination client terminal; and
at least one data terminal, including a relaying data terminal, connected to said plurality of client terminals via the local area network and to the plurality of facsimile terminals via the public switched telephone network;
wherein at least said relaying data terminal includes:
first sub-address generating means for generating a sub-address based on an operator entered electronic mail address and a predetermined functional operation method using a predetermined reference value;
data table generating means for generating an address conversion table that correlates a plurality of sub-addresses generated by said first sub-address generating means to corresponding electronic mail addresses such that each of said plurality of sub-addresses is uniquely coupled with a corresponding electronic mail address that is uniquely assigned to said destination client terminal;
data storing means for storing said address conversion table; and
terminal controlling means for controlling transmission of said predetermined reference value to said sending facsimile terminal upon receiving an incoming call from said sending facsimile terminal, for checking an incoming call containing facsimile image information and a sub-address representing said destination client terminal, and upon receiving such incoming facsimile image information and sub-address said controlling means determines an electronic mail address corresponding to said received sub-address using said address conversion table and relays said facsimile image information to said destination client terminal at said determined electronic mail address, and said controlling means examines whether said sub-address generated by said first sub-address generating means is equal to any one listed in said address conversion table, and when said sub-address generated by said first sub-address generating means is equal to one listed in said address conversion table, said controlling means changes said predetermined reference value to recalculate said sub-address such that said newly generated sub-address is different from any one listed in said address conversion table; and
wherein at least said sending facsimile terminal includes:
second sub-address generating means for generating a sub-address based on an operator entered electronic mail address and a predetermined functional operation method using said reference value; and
facsimile controlling means for controlling transmission of facsimile image information and the sub-address generated by said second sub-address generating means to said relaying data terminal.

16. The electronic communications system according to claim 15, wherein said first and second sub-address generating means use a Hash functional operation for generating said sub-address in decimal representation having a number of digits determined by a number of characters contained in said operator entered electronic mail addresses.

17. The electronic communications system according to claim 15, wherein said first and second sub-address generating means use data encryption standards for generating said sub-address.

18. The communication system according to claim 15, wherein said predetermined reference value is key information.

19. The communication system according to claim 15, wherein said predetermined reference value is an initial value which is used in the initial process of the predetermined functional operation method.

20. The electronic communications system according to claim 15, wherein at least said sending facsimile terminal further comprises electronic mail address form checking means for checking if said operator entered electronic mail address has a proper electronic mail address form, such that when an improper formed electronic mail to address is found said form checking means provides an indication of an improper electronic mail address entry and stops further operations.

21. A method of linking an entry of electronic mail address at a sending facsimile terminal and an electronic mail address of a destination client terminal via a relaying data terminal for facsimile communication to said destination client terminal, comprising:
providing a plurality of facsimile terminals connected to a public switched telephone network, said plurality of facsimile terminals including said sending facsimile terminal, wherein said sending facsimile terminal converts an electronic mail address of said destination client terminal into a sub-address assigned to said destination client terminal, said sub-address being based on said electronic mail address of said destination client terminal and a predetermined functional operation program;
providing at least one domain having at least said destination client terminal and at least said relaying data terminal, said relaying terminal being connected to said destination client terminal via a local area network and to said plurality of facsimile terminals via the public switched telephone network;

sending the facsimile image information and the sub-address to said relaying data terminal; and converting said sub-address at said relaying data terminal into an electronic mail address of said destination client terminal, said converting operation including:

provinding said relaying data terminal with an address conversion table that correlates a plurality of sub-addresses to a corresponding plurality of electronic mail addresses, wherein each of said plurality of sub-addresses is uniquely coupled with said corresponding electronic mail address, and each electronic mail address is uniquely assigned to a single client terminal; and determining for each incoming communication with facsimile image information and a sub-address an electronic mail address based on said address conversion table; and transferring said facsimile image information to said destination client terminal at said determined electronic mail address.

22. The method according to claim 21, wherein said sub-address are generated using a Hash functional operation which generates said sub-address in decimal representation having a number of digits determined by a number of characters contained in said electronic mail addresses.

23. The method according to claim 21, wherein said sub-address are generated using the functional operation method in accordance with a cipher clock chaining mode of data encryption standards.

24. The method according to claim 21, wherein said each of said plurality of facsimile terminals further comprise an electronic mail address form checker that checks if an electronic mail address is in a proper electronic mail address format such that when said electronic mail address is in an improper format said form checker provides an indication of said improper electronic mail address format and stops further operations.

25. The method according to claim 21, wherein said step of providing said data terminal with an address conversion table comprises:

generating for each of said plurality of electronic mail addresses a sub-address, said sub-address being based on the electronic mail address and a predetermined functional operation program using a predetermined reference value;

generating said address conversion table; and storing said address conversion table in said data terminal.

26. The method according to claim 25, wherein said step of providing said data terminal with an address conversion table further comprises:

examining whether said sub-address generated is equal to any one listed in said address conversion table;

changing said predetermined reference value to recalculate said sub-address when said sub-address generated is equal to one listed in said address conversion table such that said newly generated sub-address is different from any one listed in said address conversion table.

27. The method according to claim 25, wherein said step of generating sub-addresses comprises using a Hash functional operation to generate said sub-address in decimal representation having a number of digits determined by a number of characters contained in said electronic mail address.

28. The method according to claim 25, wherein said step of generating sub-addresses comprises using a functional operation method in accordance with a cipher clock chaining mode of data encryption standards.

29. The method according to claim 25, wherein said predetermined reference value is key information.

30. The method according to claim 25, wherein said predetermined reference value is an initial value which is used in the initial process of the predetermined functional operation method.

31. The method according to claim 21, wherein said sending facsimile terminal converts an electronic mail address of said destination client terminal into a sub-address assigned to said destination client terminal by generating a sub-address based on an electronic mail address and said predetermined functional operation method using said reference value.

* * * * *